US007698704B2

(12) United States Patent
Abali et al.

(10) Patent No.: US 7,698,704 B2
(45) Date of Patent: Apr. 13, 2010

(54) METHOD FOR INSTALLING OPERATING SYSTEM ON REMOTE STORAGE: FLASH DEPLOY AND INSTALL ZONE

(75) Inventors: Bulent Abali, Tenafly, NJ (US); James W. Arendt, Round Rock, TX (US); Mohammad Banikazemi, New York, NY (US); D. Scott Guthridge, New York, NY (US); Dan E. Poff, Mahopac, NY (US); Ziv Rafalovich, Yokneam (IL); Linda A. Riedle, Cary, NC (US); Gary Valentin, Tel Aviv (IL); Nancy M. Wei, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 11/059,968

(22) Filed: Feb. 17, 2005

(65) Prior Publication Data

US 2006/0184650 A1     Aug. 17, 2006

(51) Int. Cl.
G06F 9/445     (2006.01)
G06F 15/16     (2006.01)
G06F 15/177    (2006.01)
G06F 15/173    (2006.01)
G06F 13/00     (2006.01)

(52) U.S. Cl. ............... 717/177; 717/175; 717/176; 709/214; 709/220; 709/226; 711/148; 711/153

(58) Field of Classification Search ............ None
See application file for complete search history.

(56) References Cited

U.S. PATENT DOCUMENTS

| | | | |
|---|---|---|---|
| 6,256,642 B1 | 7/2001 | Krueger et al. | |
| 6,324,631 B1 | 11/2001 | Kuiper | |
| 6,329,985 B1 | 12/2001 | Tamer et al. | |
| 6,363,462 B1* | 3/2002 | Bergsten | 711/162 |
| 6,493,729 B2 | 12/2002 | Gusler et al. | |
| 6,675,268 B1* | 1/2004 | Binford et al. | 711/151 |
| 6,775,830 B1* | 8/2004 | Matsunami et al. | 717/176 |
| 7,181,578 B1* | 2/2007 | Guha et al. | 711/154 |
| 2002/0069335 A1* | 6/2002 | Flylnn, Jr. | 711/153 |
| 2002/0178335 A1 | 11/2002 | Selkirk et al. | |
| 2003/0018756 A1 | 1/2003 | Nguyen et al. | |
| 2003/0018927 A1* | 1/2003 | Gadir et al. | 714/4 |
| 2003/0140204 A1 | 7/2003 | Ashton et al. | |
| 2003/0158869 A1 | 8/2003 | Micka | |
| 2003/0188218 A1* | 10/2003 | Lubbers et al. | 714/5 |

(Continued)

Primary Examiner—Tuan Q Dam
Assistant Examiner—Isaac T Tecklu
(74) Attorney, Agent, or Firm—Gibb I.P. Law Firm, LLC (57) ABSTRACT

Two methods (native and clone) are used for installing software, such as an operating system, on client system(s) booting from shared storage. The native installation method configures an interconnection network to create an exclusive communication zone between the client system and the shared storage system and installs the operating system on the client system using the exclusive communication zone. After the software is installed, the method terminates the exclusive communication zone. The clone installation method utilizes a point-in-time copy feature of the shared storage system to clone an operating system drive instantaneously. After the drive is cloned, it is logically attached to a new client and the operating system is customized for that client.

22 Claims, 6 Drawing Sheets

U.S. PATENT DOCUMENTS

2004/0034808 A1 2/2004 Day, III et al.
2005/0102399 A1* 5/2005 Saika ........................ 709/225
2005/0229021 A1* 10/2005 Lubbers et al. ................ 714/2
2006/0174074 A1* 8/2006 Banikazemi et al. ........ 711/162

* cited by examiner

METHOD FOR INSTALLING OPERATING SYSTEM ON REMOTE STORAGE: FLASH DEPLOY AND INSTALL ZONE

BACKGROUND OF THE INVENTION

1. Field of the Invention

The present invention relates to methods for provisioning microcomputer systems where operating system data is stored in a data shared storage system. In particular, the present invention describes methods for creating and configuring operating systems and configuring storage and networking systems such that servers can be provisioned in an automatic manner.

2. Description of the Related Art

Within interconnected computer systems, Fibre Channel (FC) switch zoning is used to ensure that server ports and storage controller ports are visible or not visible from each other depending on the security policy. Fibre channel zones are conventionally used for security purposes. Another primary reason for the use of zoning is the performance impact related to adding/removing devices where a zone restricts the devices involved in the associated fiber channel protocols. This is very significant as the size of the storage area network grows. A zone is a logical entity administered by FC switches, in which FC ports that are in the same zone can see each other through the FC network. Typically, a server's port(s) and a storage controller's port(s) are put in the same zone so that they can see each other, and so that the host can access the logical disks on the storage controller.

In a typical FC configuration, a host will have multiple paths available from itself to the storage controller ports for high availability purposes. However, during some software installations (such as when installing an operating system), the multiple paths confuse the install programs because a single logical disk can appear many times over multiple paths. For example, the Windows install program does not know how to deal with multiple paths. When such installations fail, it is sometimes necessary for the administrator to physically remove or disable cables/adapters/ports to eliminate the multiple paths. To the contrary, it would be desirable if the installation of such software programs could be performed automatically.

SUMMARY OF THE INVENTION

In embodiments herein a method and service for installing software, such as an operating system, on client system(s) creates a point-in-time copy of the operating system on a storage unit within the shared storage system. The method configures an interconnection network to create an exclusive communication zone between the client system and the shared storage system and installs the operating system on the client system using the exclusive communication zone. After the software is installed, the method terminates the exclusive communication zone.

For SAN systems where the client system lacks a permanent storage device, the method also creates an operating communication zone after the exclusive communication zone is terminated. When using the operating communication zone, the client system operates by communicating with the storage unit over selected ones of the shared storage system access ports using any of the client system access ports.

To configure the exclusive communication and operating communication zones, the method programs switches within the interconnection network. This exclusively dedicates a client system access port and a shared storage system access port to one another and excludes all other access ports from communicating with the client system access port and the shared storage system access port while the exclusive communication zone exists. In one alternative, a plurality of client system access ports and a plurality of the shared storage systems can be included within the exclusive communication zone. When creating the copy of the operating system, the method can use a golden disk of the operating system and can also use a flash-copy process.

These, and other, aspects and objects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

Figure 1:
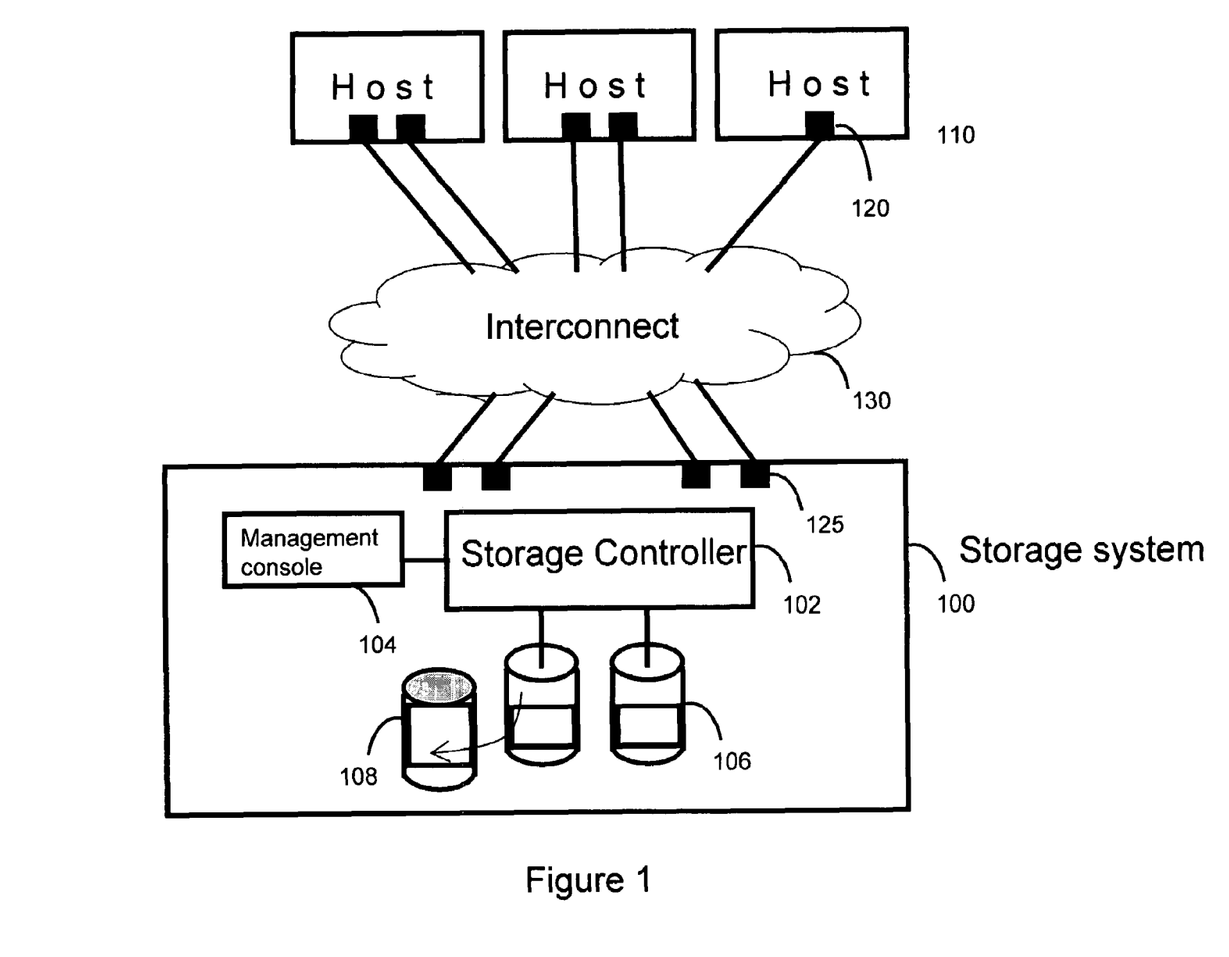
FIG. 1 is a schematic diagram that shows an example of the system of interest for the present invention.

FIG. 1 shows a system of interest where one or more microcomputer systems (110) called host systems or clients are connected to a shared storage system (100) through an interconnection network (130) which includes a collection of interconnection switches and links. Host systems are connected to the interconnection network through their host channel adapter (HCA) ports (120) and shared storage systems are connected to the interconnection network through their transmission channel adapter (TCA) ports (125). The shared storage system comprises a control unit called a storage controller (102), possibly a management console (104) which may or may not be an integrated part of the shared storage system, and one or more physical storage devices (106) such as hard disks, some containing golden disks of operating systems. The shared storage system may or may not be capable of creating point-in-time copies (108) of storage volumes.

Figure 2:
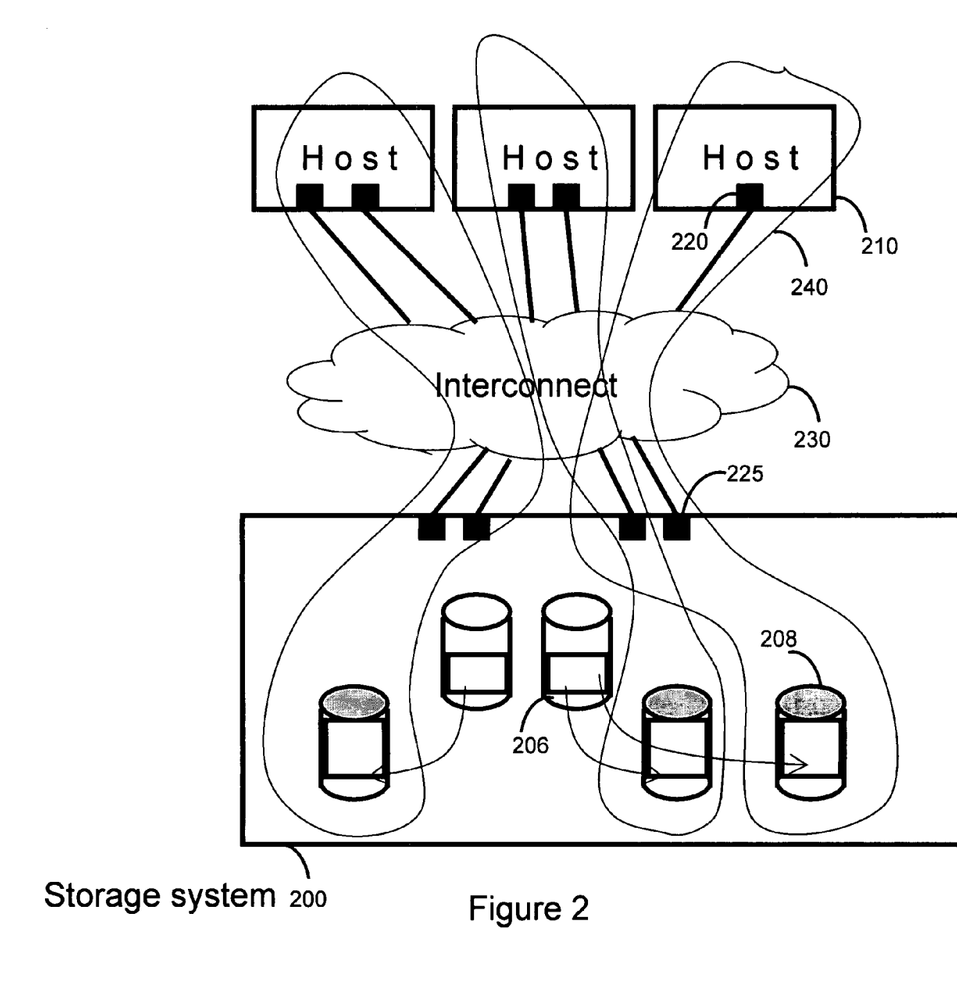
FIG. 2 is a schematic diagram that shows one instance of a system with three host systems being provisioned used three point-in-time copies of two golden disks along with interconnect configuration (zoning)

According to method and service embodiments of the present invention, a time and space efficient point-in-time copy operation (or other similar copy operation) is used to create a bootable disk for a given host system (server) and the interconnection network is configured such that the server can boot and operate from the copy volume. In this embodiment, it is assumed that there is an image of the software to be copied (operating system (O/S) of interest) already installed on a storage volume (206). Then, a point-in-time copy of this volume (208) is created by the storage subsystem. This copy operation may or may not be space and time efficient copy. If the shared storage system can support a time/space efficient copy operation, the copy operation is performed almost instantaneously. This leads to a significant reduction in time required for installing and provisioning a new server. The shared storage system (200) and interconnection network (230) are then configured such that the host system of interest (210) can access this copy volume from which it can boot.

In an embodiment of this invention, the shared storage system is programmed such that the copy volume is mapped to the host system of interest. The host system can be identified by a unique ID such as the World Wide ID of its Host Channel Adapter (HCA) port (220). Furthermore, the interconnection network is configured such that the host system can access the copy volume. This can be achieved by programming the Fibre Channel switches required for establishing connection from the host to the shared storage system. This creates a Fibre Channel zone (240). The ID of HCA port(s) of the host (220) and the ID of Transmission Channel Adapter (TCA) port(s) of the shared storage system (225) are added to the zone. One or more HCA ports and TCA ports can be added to the zone created for this purpose. Therefore, one or more paths can be available between a host and a shared storage system and the interconnect configuration can be selected such that multiple paths between the host and the shared storage system are used if the operating system of interest can support multipath connections.

The operating system of interest is setup on the logical disk, either using clone or native installation. In the present invention, sometimes called Flash-Deploy, clone installation uses available flash-copy services provided by the shared storage system for rapid installation. One example of flash-copy is shown in US Patent Application 2003/005235, which is incorporated herein by reference. Flash-copy is an advanced storage controller function that instantaneously creates a point in time copy of a logical disk. Flash copy has only been previously used for making a backup of a disk. The present invention expands the use of flash-copy for the purpose of provisioning (installing) operating systems on host or client systems.

The advantage of flash-deploy is it can cut the "clone method" of O/S installation time from an order of 1-2 hours to about 3 minutes. Flash-deploy can use a golden disk available on one of the logical disks on the storage controller. The golden disk image is first created by either cloning an existing O/S disk by using existing disk imaging methods or by a normal O/S native install method. Then, using the flash-copy function, the operating system is cloned as many times as is needed. Each cloned logical disk is logically attached to a new server and the server is booted from it, thereby rapidly deploying a large number of servers in minutes.

As mentioned previously, another problem solved by this invention occurs during native installations when there are multiple paths from server's ports to the storage controller's ports. Installation of a new operating system requires single path access to the system disk. Thus, the invention controls the switches within the interconnection network to create a special exclusive communication zone, the Installzone, to address this issue.

During the installation of the O/S, the invention issues a set of commands to the FC switches to remove the server's ports from the zones where they would normally exist. The invention puts a single host port and a single storage controller port into the special Installzone. Basically, when the exclusive communication zone is established, there is a single server port and a single storage controller port in the install zone. The regular operating zone, at this time, will contain both storage controller ports and the server ports for other servers apart from the server being installed. This ensures that only a single logical path will exist from the host to the storage controller. After the installation of the software is completed, the invention eliminates the Installzone, and adds all the host ports to the zone or zones where they would have normally existed and be operating. One advantage presented by the invention is that it eliminates the need for a system administrator to physically remove cables/adapters when installing operating systems. Therefore, with the invention, installation of software such as operating systems over FC can be automated by management tools.

Figure 3:
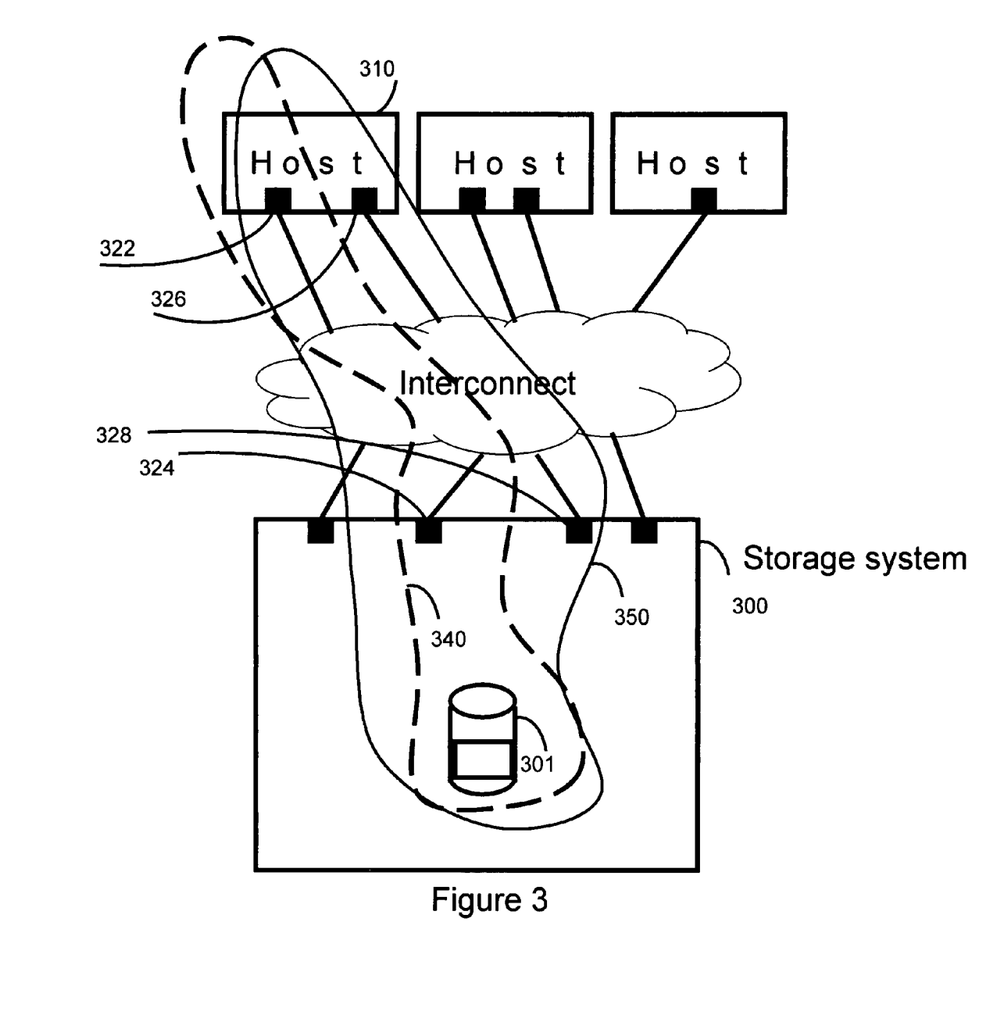
FIG. 3 is a schematic diagram that shows a system with interconnect configurations (zonings) for preparing a host system (server) for an install and then for normal operations.

In another embodiment of the present invention, shown in FIG. 3, the interconnection network is configured such that a server can install the operation system on a storage area network (SAN) device and appropriately boot from it. In the SAN environment, servers typically do not have locally attached disks. There are physical disks on the remote storage controller. The servers attach via an I/O network, comprising fiber channel switches, links and adapters. Through a set of commands issued to the storage controller, a logical disk is carved out of physical disks, and that logical disk is made accessible over the FC network to a server.

For SAN systems where the client system lacks a permanent storage device, the method also creates an operating communication zone after the exclusive communication zone is terminated. In order to perform the install through network servers or operating system CDs, the host system, interconnection network, and shared storage system are to be configured such that the host system can access a storage unit (LUN) during the install process and after the process is completed.

In this embodiment, first a LUN (301) is chosen for installing the operating system and other applications on it. Then, the shared storage system (300) is configured such that this LUN is mapped to the host system of interest (310) which can be identified by the ID of one of its HCA ports (322). Then, the interconnection network is configured such that the host can reach the LUN. This is accomplished by creating a special zone, called the Installzone (340), and adding one single HCA port (322) and one TCA port (324) to the zone. Before the creation of the Installzone, other zones are searched and the HCA port which are used in the Installzone are removed from any other zone. This way there exists only one logical path between the host and the shared storage system. This is used because some operating systems are not able to support multipath connections during the install process.

Once the installation is complete, the Installzone is destroyed and a new operating zone (350) is created such that the host can reach the LUN through multiple paths, if that is a feature supported by the installed system. In particular, as shown in FIG. 3, if the host is connected to the interconnection network through two HCA ports (322 and 326) these ports are added to the operating communication zone. Similarly, one or more TCA ports can be added to this operating communication zone. In FIG. 3, for example two TCA ports (324 and 328) are added to the operating communication zone. Furthermore, the shared storage system is configured such that the host system can reach its LUN through multiple ports if the host chooses to do so.

Figure 4:
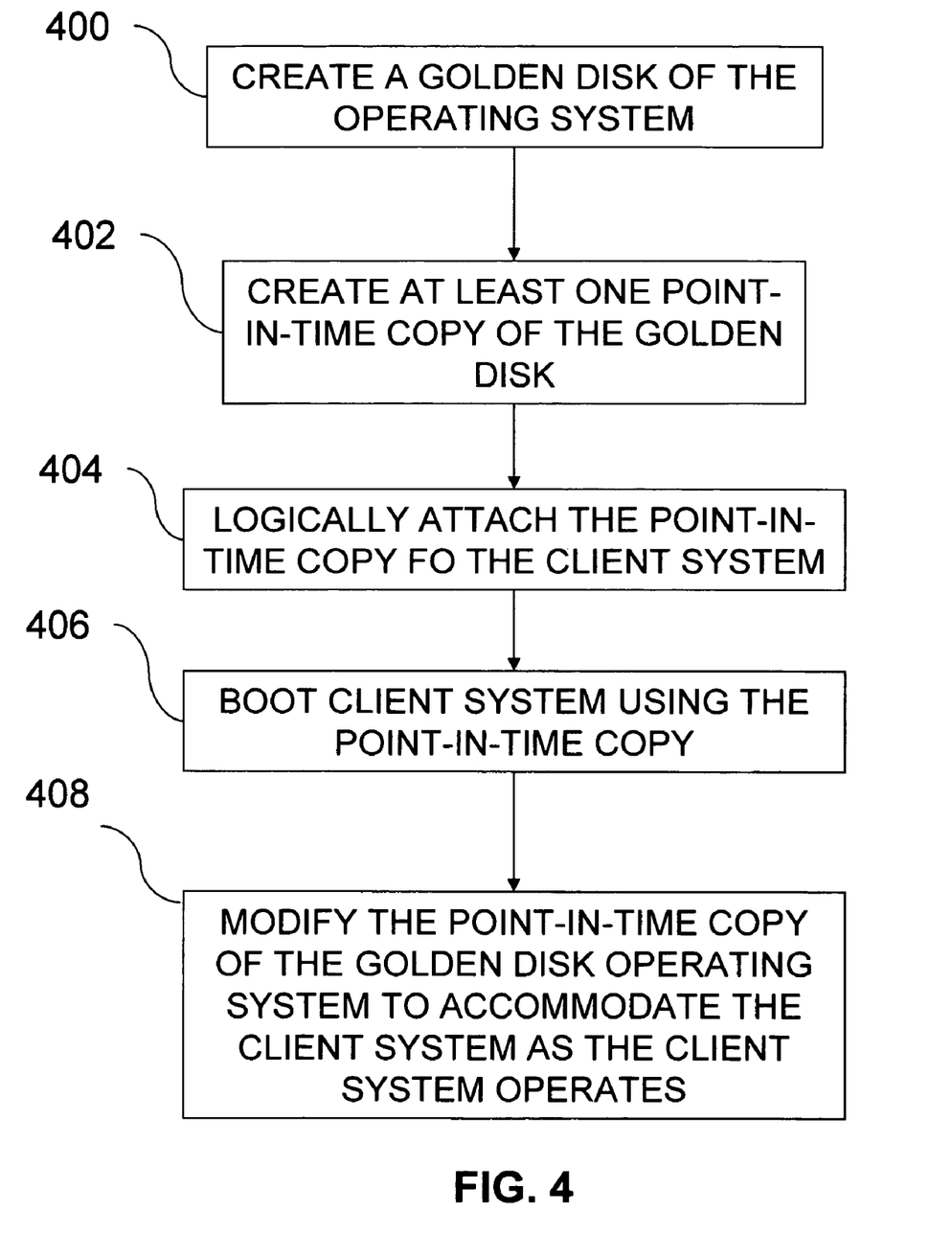
FIG. 4 is a flow chart showing embodiments herein.

FIG. 4 illustrates the inventive flash deploy method and service provided by the invention in flowchart form. More specifically, in item 400, the method creates a golden disk of the operating system on a logical disk of the storage controller. The "golden disk" is more than just a copy of a file and instead comprises a golden image of the entire logical disk. The golden disk can be created, for example, by normal operating system native install methodologies. Next, in item 402, the invention creates at least one point-in-time copy of the golden disk. The creating of the point-in-time copy comprises either a clone installation or a native installation. In item 404, the invention logically attaches the point-in-time copy to the client system. Next, the client system is booted using the point-in-time copy in item 406 and the client system begins to operate using the golden disk operating system in item 408. Thus, the invention modifies the point-in-time copy of the golden disk operating system to accommodate the client system as the client system operates. The process of creating the point-in-time copy can create a plurality of point-in-time copies of the golden disk, wherein each point-in-time copy is attached to a different client system. Thus, as each point-in-time copy is used according to the unique requirements of each individual client system, the invention uniquely modifies each point-in-time copy.

Figure 5:
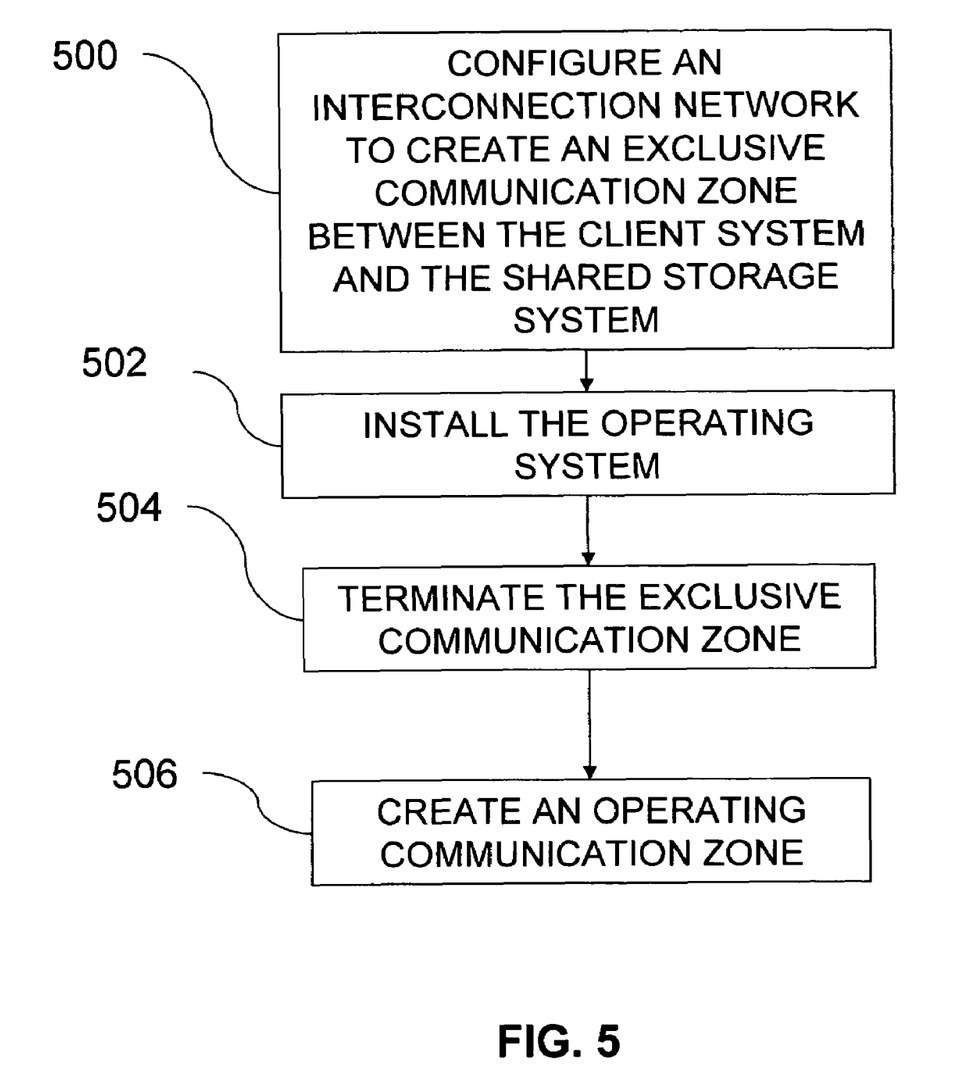
FIG. 5 is a flow chart showing embodiments herein.

FIG. 5 illustrates the exclusive communication zones method in flowchart form. The method configures an interconnection network to create an exclusive communication zone between the client system and the shared storage system in item 500. To configure the exclusive communication and operating communication zones, the method programs switches within the interconnection network. This exclusively dedicates a client system access port and a shared storage system access port to one another and excludes all other access ports from communicating with the client system access port while the exclusive communication zone exists. In one alternative, a plurality of client system access ports and a plurality of the shared storage systems can be included within the exclusive communication zone.

In item 502, the invention installs the operating system on the client system using the exclusive communication zone. After the software is installed, the method terminates the exclusive communication zone in item 504. The method also creates an operating communication zone after the exclusive communication zone is terminated in item 506. When using the operating communication zone, the client system operates by communicating with the storage unit over selected ones of the shared storage system access ports using any of the client system access ports.

Figure 6:
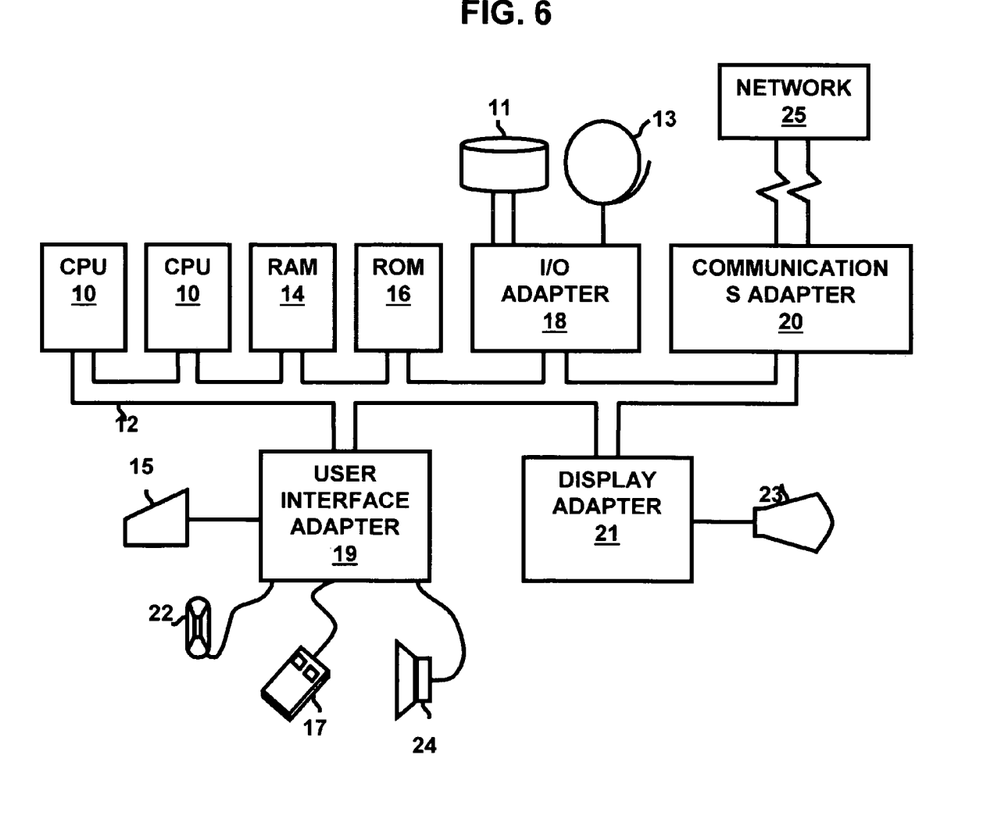
FIG. 6 is a hardware diagram upon which the invention can operate.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The present invention makes automation of the install process possible. In particular the use of Installzone makes it possible to avoid any need for removing physical connections (cables and switches) in order to provide a single logical path between the host and shared storage system. Once the system is configured, the install can start. The install itself can be performed manually or automatically (simulated CD installation via network boot) through the use of network install agents and servers. Flash-deploy allows deployment of a new client with an OS in about a minute. Standard cloning methods usually take a minimum of 20 minutes.

While the invention has been described in terms of preferred embodiments, those skilled in the art will recognize that the invention can be practiced with modification within the spirit and scope of the appended claims.

What is claimed is:

1. A computer-implemented method for installing a software program on at least one client system, said method comprising:
    creating a point-in-time copy of a storage unit containing said software program within a shared storage system;
    configuring a computer network to create an exclusive communication zone between said client system and said point-in-time copy within said shared storage system;
    installing said software program on said client system using said exclusive communication zone; and
    terminating said exclusive communication zone after said installing of said software program is completed;
    accessing ports using any of a client system access ports, after said exclusive communication zone is terminated,
    wherein said configuring of said computer network comprises exclusively dedicating said client system access port and a shared storage system access port to one another,
    wherein said dedicating process excludes all other access ports from communicating with said client system access port while said exclusive communication zone exists.

2. The method according to claim 1, wherein said configuring of said exclusive communication zone comprises programming switches within said network.

3. The method according to claim 1, wherein said dedicating process includes a plurality of client system access ports and a plurality of shared storage system access ports within said exclusive communication zone.

4. The method according to claim 1, wherein said creating of said copy of said software program uses a golden disk of said software program to create said copy.

5. A computer-implemented method for installing an operating system on at least one client system, wherein said client system includes multiple client system access ports, said method comprising:
    creating a point-in-time copy of a storage unit containing said operating system within a shared storage system, wherein said shared storage system includes multiple shared storage system access ports;

configuring an interconnection network to create an exclusive communication zone between said client system and said point-in-time copy within said shared storage system;

installing said operating system on said client system using said exclusive communication zone;

terminating said exclusive communication zone after said installing of said operating system is completed; and creating an operating communication zone where said client system operates by communicating with said storage unit over selected ones of said shared storage system;

accessing ports using any of said client system access ports, after said exclusive communication zone is terminated, wherein said configuring of said interconnection network comprises exclusively dedicating said client system access port and said shared storage system access port to one another, wherein said dedicating process excludes all other access ports from communicating with said client system access port while said exclusive communication zone exists.

6. The method according to claim 5, wherein said configuring of said exclusive communication zone comprises programming switches within said interconnection network.

7. The method according to claim 5, wherein said dedicating process includes a plurality of client system access ports and a plurality of shared storage systems within said exclusive communication zone.

8. The method according to claim 5, wherein said creating of said copy of said operating system uses a golden disk of said operating system to create said copy.

9. A service supported by a computer for performing a method for installing a software program on at least one computer-readable storage medium of at least one client system, said service comprising:

creating a point-in-time copy of a storage unit containing said software program within a shared storage system;

configuring a computer network to create an exclusive communication zone between said client system and said point-in-time copy within said shared storage system;

installing said software program on said client system using said exclusive communication zone; and terminating said exclusive communication zone after said installing of said software program is completed;

accessing ports using any of a client system access ports, after said exclusive communication zone is terminated, wherein said configuring of said exclusive communication zone comprises exclusively dedicating said client system access port and a shared storage system access port to one another, wherein said dedicating process excludes all other access ports from communicating with said client system access port while said exclusive communication zone exists.

10. The service according to claim 9, wherein said configuring of said exclusive communication zone comprises programming switches within said network.

11. The service according to claim 9, wherein said dedicating process includes a plurality of client system access ports and a plurality of shared storage system access ports within said exclusive communication zone.

12. The service according to claim 9, wherein said creating of said copy of said software program uses a golden disk of said software program to create said copy.

13. A computer-implemented method for installing an operating system on at least one at least one computer-readable storage medium of at least one client system connected to a shared storage controller, said method comprising:

creating a golden disk of said operating system on a logical disk of said storage controller;

creating at least one point-in-time copy of said golden disk; and logically attaching said point-in-time copy to said client system thereby installing said operating system on said at least one client system;

configuring a computer network to create an exclusive communication zone between said client system and said point-in-time copy of said golden disk within a shared storage system;

installing said operating system on said client system using said exclusive communication zone; and terminating said exclusive communication zone after said installing of said software program is completed;

accessing ports using any of a client system access ports, after said exclusive communication zone is terminated, wherein said configuring of said exclusive communication zone comprises exclusively dedicating said client system access port and a shared storage system access port to one another, wherein said dedicating process excludes all other access ports from communicating with said client system access port while said exclusive communication zone exists.

14. The method in claim 13, further comprising booting said client system using said point-in-time copy.

15. The method in claim 13, further comprising modifying said point-in-time copy to accommodate said client system as said client system operates.

16. The method in claim 13, wherein said creating of said point-in-time copy comprises one of a clone installation and a native installation.

17. The method in claim 13, wherein said creating of said point-in-time copy creates a plurality of point-in-time copies of said golden disk, wherein each point-in-time copy is attached to a different client system.

18. The method in claim 17, further comprising uniquely modifying each point-in-time copy according to unique requirements of each individual client system.

19. A computer storage medium readable by computer tangibly embodying a program of instructions executable by said computer for performing a method for installing a software program on at least one client system, said method comprising:

creating a point-in-time copy of a storage unit containing said software program within a shared storage system;

configuring a computer network to create an exclusive communication zone between said client system and said point-in-time copy within said shared storage system;

installing said software program on said client system using said exclusive communication zone; and terminating said exclusive communication zone after said installing of said software program is completed;

accessing ports using any of a client system access ports, after said exclusive communication zone is terminated, wherein said configuring of said exclusive communication zone comprises exclusively dedicating said client system access port and a shared storage system access port to one another, wherein said dedicating process excludes all other access ports from communicating with said client system access port while said exclusive communication zone exists.

20. The program storage device according to claim 19, wherein said configuring of said exclusive communication zone comprises programming switches within said network.

21. The program storage device according to claim 19, wherein said dedicating process includes a plurality of client system access ports and a plurality of shared storage system access ports within said exclusive communication zone.

22. The program storage device according to claim 19, wherein said creating of said copy of said software program uses a golden disk of said software program to create said copy.

* * * * *